United States Patent [19]
Carberg et al.

[11] 4,197,990
[45] Apr. 15, 1980

[54] ELECTRONIC DRAIN SYSTEM

[75] Inventors: William G. Carberg, Scotia, N.Y.; Mark R. Ford, Jr., Brighton, Mass.

[73] Assignee: General Electric Company, Schenectady, N.Y.

[21] Appl. No.: 937,086

[22] Filed: Aug. 28, 1978

[51] Int. Cl.² ............................................. G01N 25/10
[52] U.S. Cl. ........................................ 236/1 R; 236/56; 73/17 A
[58] Field of Search ...................... 236/1 R, 56, 59; 340/521; 415/168; 62/225, 292, 149; 73/29, 17 A

[56] References Cited

U.S. PATENT DOCUMENTS

| | | | |
|---|---|---|---|
| 2,813,681 | 11/1957 | Hottenroth, Jr. | 236/56 |
| 3,694,103 | 9/1972 | Cohen et al. | 415/168 |
| 4,063,228 | 12/1977 | Eggenberger et al. | 340/521 |
| 4,106,306 | 8/1978 | Saunders | 62/149 |

*Primary Examiner*—William E. Wayner
*Attorney, Agent, or Firm*—James W. Mitchell; John F. Ahern

[57] ABSTRACT

The disclosure relates to automated drain valves for pressurized fluid conduits such as steam conduits. Recognizing that there is a direct relationship between steam temperature and steam pressure at the saturation line; the saturation line is used to derive a variable set point for an automated drain system and method. The saturation temperature is compared with the actual temperature to determine the positioning of the conduit drain valves.

4 Claims, 2 Drawing Figures

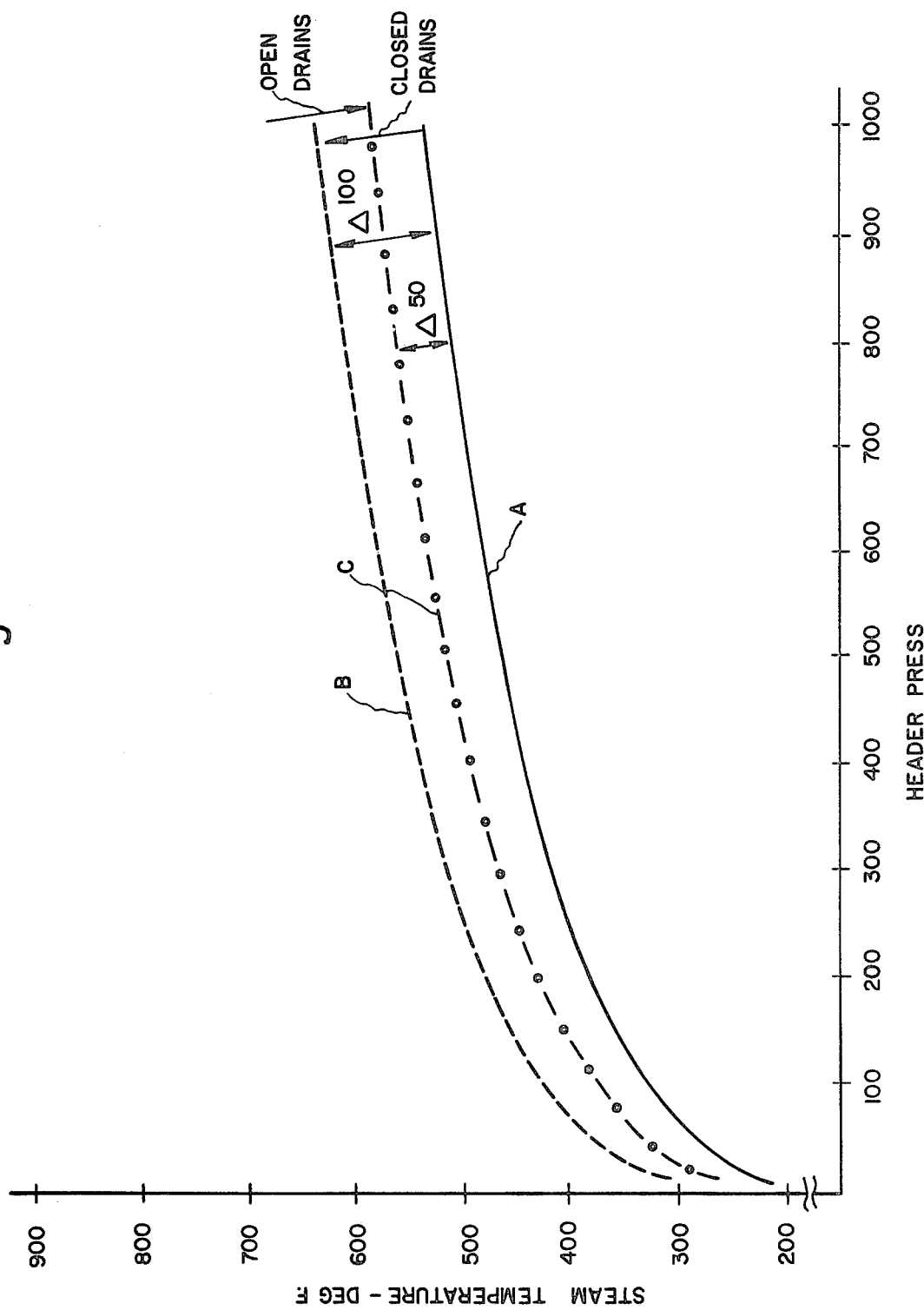

ELECTRONIC DRAIN SYSTEM

BACKGROUND OF THE INVENTION

This disclosure relates, in general, to automated systems for process plants and power plants; and, in particular, relates to an automated drain system and method for servicing a steam flow conduit.

In a process or power plant wherein a two-phase fluid is transferred from one point to another it is important to provide for drainage of any condensate which may occur along the fluid flow path. Particularly, in a power plant in a location upstream from a turbomachine it is important from a potential blade erosion point of view to ensure that any condensate in a fluid delivery header be disposed of by drainage so that water droplets are not entrained in the steam whereupon they may thereafter be carried into the turbomachine. Moreover, it is desirable to immediately remove condensate from a turbomachine casing in order to obviate the possibility of unequal thermal gradients within the turbomachine shell which may thereafter lead to distortion of the turbomachine casing.

One prior art system for effecting automatic drain control is shown and described in U.S. Pat. No. 3,694,103 to Cohen et al. In that patented system load conditions on a turbine are sent through a pressure switch such that drain valve actuation is effected as the turbine load falls to a predetermined level such as 20% of rated load. Thus the drain valves will open at one predetermined set point. While this system may control drain valve position during a drastic change in turbomachine pressure it does not accommodate steam temperature changes at high pressures during which condensation could also occur.

Another prior art system for detecting the occurrence of moisture in a steam conduit is shown in U.S. Pat. No. 4,063,228 to Eggenberger and Miller. That patented system detects the rate of temperature change in a steam conduit in order to detect the presence of moisture. The present invention differs in its approach in that conduit pressure is used to determine a variable set point potential for the occurrence of moisture which is then compared with an actual operating condition.

In accordance with the present invention, a method and system hardware has been developed for an automated drain system which will accurately respond at all combinations of steam temperature and pressure occurring within a steam conduit. The invention has been designed and developed to complement various other automated procedures for power plant start-up and operation. The present invention provides a method and apparatus for an automated drain system which utilizes a variable drain opening and closing set point in accordance with actual sensed conditions within a steam line.

Other objects, advantages and features of the present invention will become apparent from the following description of a preferred embodiment thereof when read in connection with the accompanying drawing.

BRIEF DESCRIPTION OF THE INVENTION

The present invention depends upon the relationship between steam pressure and steam temperature to define a saturation curve. The method involves the steps of sensing steam pressure in a steam conduit and converting the steam pressure into a saturation temperature. If the actual sensed steam temperature exceeds the saturation steam temperature by a predetermined amount then the drain valves will close. If the actual sensed steam temperature approaches the saturation temperature by a predetermined amount then the drain valves will open. In carrying out the present invention one element is the use of a function generator which converts the sensed steam pressure into a saturation temperature in accordance with a specified relation. Thereafter, electronic comparators compare the actual steam temperature with the saturation steam temperature in order to control the drain valve position.

BRIEF DESCRIPTION OF THE DRAWINGS

FIG. 2 is a graphical representation of the relationship of steam temperature to steam pressure and further discloses a saturation temperature curve and variable set points for drain opening and drain closing.

DETAILED DESCRIPTION OF THE INVENTION

Figure 1:
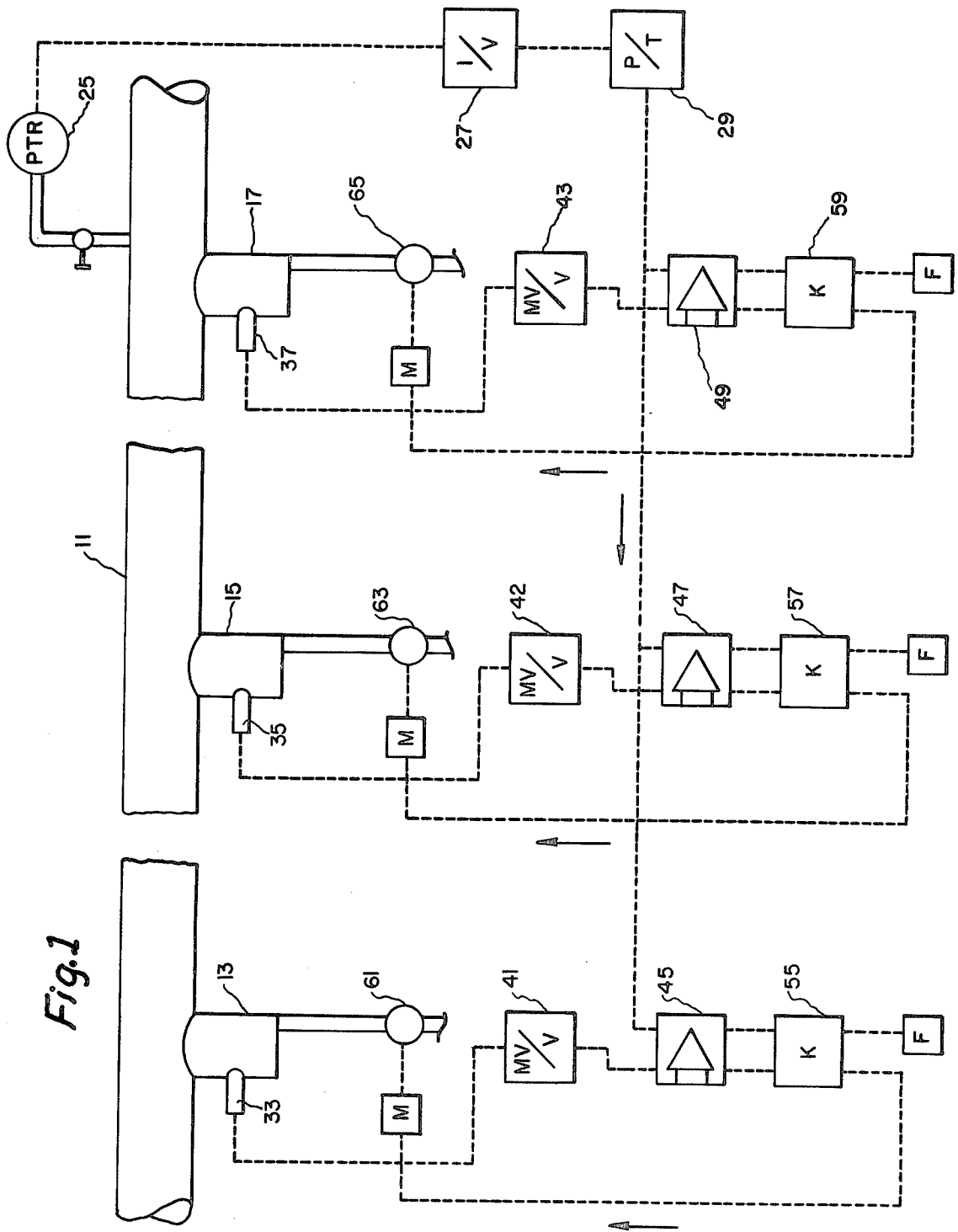
FIG. 1 is a system schematic which shows a steam conduit, analog sensing means, electronic processors and valve operators.

The present invention has been devised for a combined cycle power plant wherein a heat recovery steam generator (HRSG) supplies steam to one or more steam turbines. Combined cycle power plants are well known in the power plant art and comprise at least one gas turbine, one steam turbine and a heat recovery steam generator. The HRSG thermodynamically links the gas turbine and the steam turbine wherein gas turbine exhaust gas is passed in a heat exchange relationship with feedwater which converts the feedwater to steam. There can be more than one HRSG and more than one steam turbine. Furthermore, while the specific example shown reflects the original design objective of the present invention it is clear that the invention may be applied to any process fluid conduit which contains a two-phase fluid. Moreover, in a power plant which utilizes steam as a motive fluid, the present invention may be applicable also to turbine casing drains and other points susceptible to fluid condensation.

In FIG. 1, a fluid header II connects at least one heat recovery steam generator, not shown, with at least one steam turbine also, not shown. Drain collection pots 13, 15 and 17 are affixed to low spots in the fluid header. The electronic drain system, of the present invention, drains water from these collection pots.

Sensing means are used to obtain temperature and pressure data from the header and drain collection pots. For example, a pressure transducer 25 measures the fluid pressure in header II and provides an output current (I) proportional to the steam pressure. The output current (I) is converted to a voltage (V) in a current to voltage converter 27. The output of converter 27 is input into a function generator 29 which provides an electrical output equivalent to a saturation temperature at the measured pressure. As will be explained, this saturation temperature varies with pressure so as to become a variable set point to the automated drain system.

Each of the drain pots 13, 15 and 17 are equipped with thermocouples 33, 35, and 37 respectively which measure the fluid temperature in each conduit connected to the main steam header. The output of each thermocouple is an electrical voltage proportional to the measured temperature. The respective outputs of each thermocouple are selectively input into voltage amplifiers 41, 42 and 43. The voltage amplifiers each output separate voltage signals for each thermocouple which are then input into respective signal comparators 45, 47 and 49. A second input into each of the signal comparators 45, 47 and 49 is the output of function generator 29. The output of each signal comparator is input into respective contact output isolators 55, 57 and 59 which are connected to motorized drain valves 61, 63 and 65. A second output from each signal output could be an electrical signal indicative of system failure as signified in a failure alarm F connected to each electrical contact device.

Referring to FIG. 2, a representation is made of steam temperature versus steam pressure. The plotted solid line "A" is saturation temperature which varies with temperature and pressure. The function generator 29 is a programmable device manufactured by The Foxboro Company (Foxboro, Massachusetts), Model No. 2AP+SGC, which enables the data shown on line A to be electronically reproduced and input into the comparators.

Line B shows a broken line which represents the cruve for closing the electronic drains. This line is set by line A but is some constant temperature difference, perhaps 100° F. higher than line A. This is an arbitrary set point based upon experience and a knowledge of system conditions and requirements. Line C (dot/dash) is a drain opening line which occurs at a delta of about 50° F. above the saturation temperature line. The comparators 45, 47 and 49 are preset to accommodate these values and thus control the respective drain valves in accordance with FIG. 2.

The method of the present invention is practiced in accordance with the following steps:
Sensing fluid pressure in the fluid conduit;
Converting fluid pressure to an electronic voltage indicative of a saturation temperature;
Sensing fluid temperature at drain location;
Comparing said saturation temperature with the sensed fluid temperature at each drain location; and,
Positioning each drain valve in either a valve open or valve closed position in accordance with the output of said comparing step.

The invention as practiced according to the present method further includes the step of closing the drain valve whenever the actual temperature exceeds the saturation temperature by 100° F. as the temperature difference increases. In addition, there is included the step of opening the drain valve whenever the actual temperature is less than 50° above the saturation temperature as the temperature difference decreases.

While there has been shown what is considered at present to be the preferred embodiment of the invention; it is, of course, understood that various other modifications may be made therein, and it is intended to claim all such modifications as fall within the true spirit and scope of the present invention.

What is claimed is:

1. A system for automatically operating at least one drain valve in a fluid conduit in accordance with a variable fluid temperature-pressure relation, the system comprising:
   means for measuring the actual fluid temperature;
   means for measuring the actual fluid pressure;
   means for generating a saturation temperature based on the actual fluid pressure;
   means comparing the saturation temperature with the actual temperature; and,
   means for operating said drain valve in accordance with the output of said comparing means.

2. A system for automatically operating at least one drain valve in a fluid conduit, the system comprising:
   a thermocouple for measuring the actual fluid temperature;
   a pressure sensor for measuring the actual fluid pressure;
   an electronic function generator for providing a saturation temperature based upon the output of said pressure sensor;
   a signal comparator for comparing the actual temperature with the saturation temperature; and,
   means for operating said drain valve in accordance with the output of said signal comparator.

3. The system recited in claim 2 wherein said signal comparator includes:
   a drain closing set point at a predetermined first difference in the temperature difference increasing direction above the saturation temperature; and,
   a drain opening set point in between the predetermined first difference and the saturation temperature in the temperature difference decreasing direction.

4. A method of operating a drain valve in a steam conduit comprising the steps:
   measuring the steam pressure in the steam conduit;
   converting the steam pressure signal into a saturation temperature signal;
   measuring the actual steam temperature;
   comparing the saturation temperature signal with the actual steam temperature;
   closing said drain valve whenever the actual steam temperature exceeds the saturation temperature signal by a predetermined temperature difference as the temperature difference increases; and,
   opening said drain valve whenever the actual temperature is less than a predetermined temperature difference above the saturation temperature signal as the temperature difference decreases.

* * * * *